(12) United States Patent
Eddy

(10) Patent No.: X9372
(45) Date of Patent: Feb. 10, 1836

(54) SPINDLE AND FLYER FOR TWISTING, ROPING, AND YARN OF COTTON HEMP OR FLAX

(76) Inventor: Willard T. Eddy

1,

9372X Willard T. Eddy 2-10-1836

Letters Patent.

The Schedule referred to in these Letters Patent and a
making part of the same containing a description in the words
of the said Willard T. Eddy, himself of his improvement in the
<u>Spindle and Flyer for twisting roping and yarn of Cotton, hemp
or flax</u>

Be it known that I, Willard T. Eddy, of the Town of Ithica, in the
County of Tomkins, and State of New York, have made an improve
ment in the spindle and flyer for twisting roping and yarn of
Cotton, hemp or flax, which is described as follows, reference
being had to the annexed drawings of the same, making part of this
specification. 1st the flyer marked A, is fastened on the end of a
tube B, separate from the spindle C. — 2nd the spindle C is placed
in a line with the centre of the tube B, having the end of the
spindle which is farthest from the tube made broad and flat
as represented at D, with a round hole in its centre, through which
passes a round pin or axle E, on which it turns; this axle being
fixed in the head of a standard, E2, divided at top into two
parts, between which the flat end of the spindle is placed and
and works in the manner of a joint. This standard is fastened
to a carriage which has a traverse motion produced by a
breast wheel or otherwise for laying the thread evenly on the
spool. — 3d A spring F, is fastened to the standard and bears
against the end of the spindle for keeping it in its place.
4th another spring G is fastened to the opposite side of the standard
& is made to bear against the washers H for keeping them up close
to the end of the spool I; the other end of the spool bearing against
a washer K secured by a pin passing through the end of the spindle
5th A guide K is fixed to the flyer at the head near the head

[illegible]

[illegible] 9372X 2-10-1836 2, through which the thread is passed, in order to keep it from
touching the head of the spool. - 6th A pulley M. is fixed
on the tube of the flyer. - 7th The tube of the flyer turns in the head
of a forked standard N fastened to the frame.
8th The roping after leaving the drawing cylinders passes through
the tubes - then through the guards and then through the coil at
the end of the flyer to the spool around which it is wound. -
Motion is given to the spindle by the band passing around the
pulley, which with the motion of the spool & the drawing
cylinders gives the necessary twist to the thread - the traverse
motion of the carriage at the same time laying it evenly
over the spool. When the spool is full the spring is drawn back
from the end of the spindle - the spindle turned out of the way
of the flyers - the filled spool removed and an empty one put
in its place; the spindle is then turned down to its proper position
and the operation continued as before.

What I claim as my invention and desire to secure by Letters
Patent consists in the combination, arrangement, and adapta
tion of the several parts of the before described spindle and
flyer for twisting roping; but I particularly claim the mode
of hanging the spindle on a joint and securing it by a spring or
the spring bearing against the end of the spool.

[illegible] Witnesses
[illegible] Wm. [illegible] Elliot
[illegible] Hellincy

W. S. Eddy 750
([illegible])

(Granted 10th of February 1836.)

Drawing

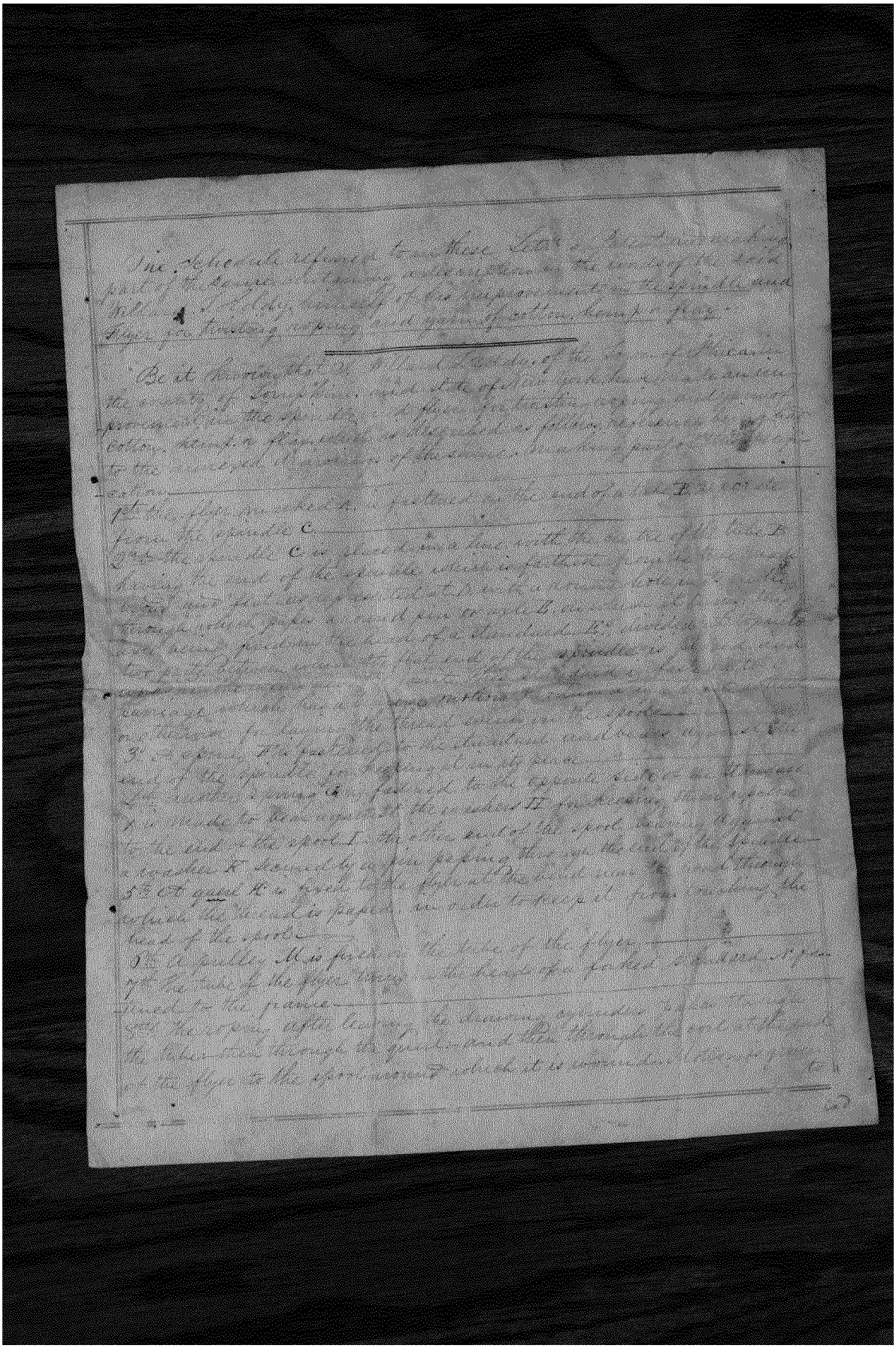

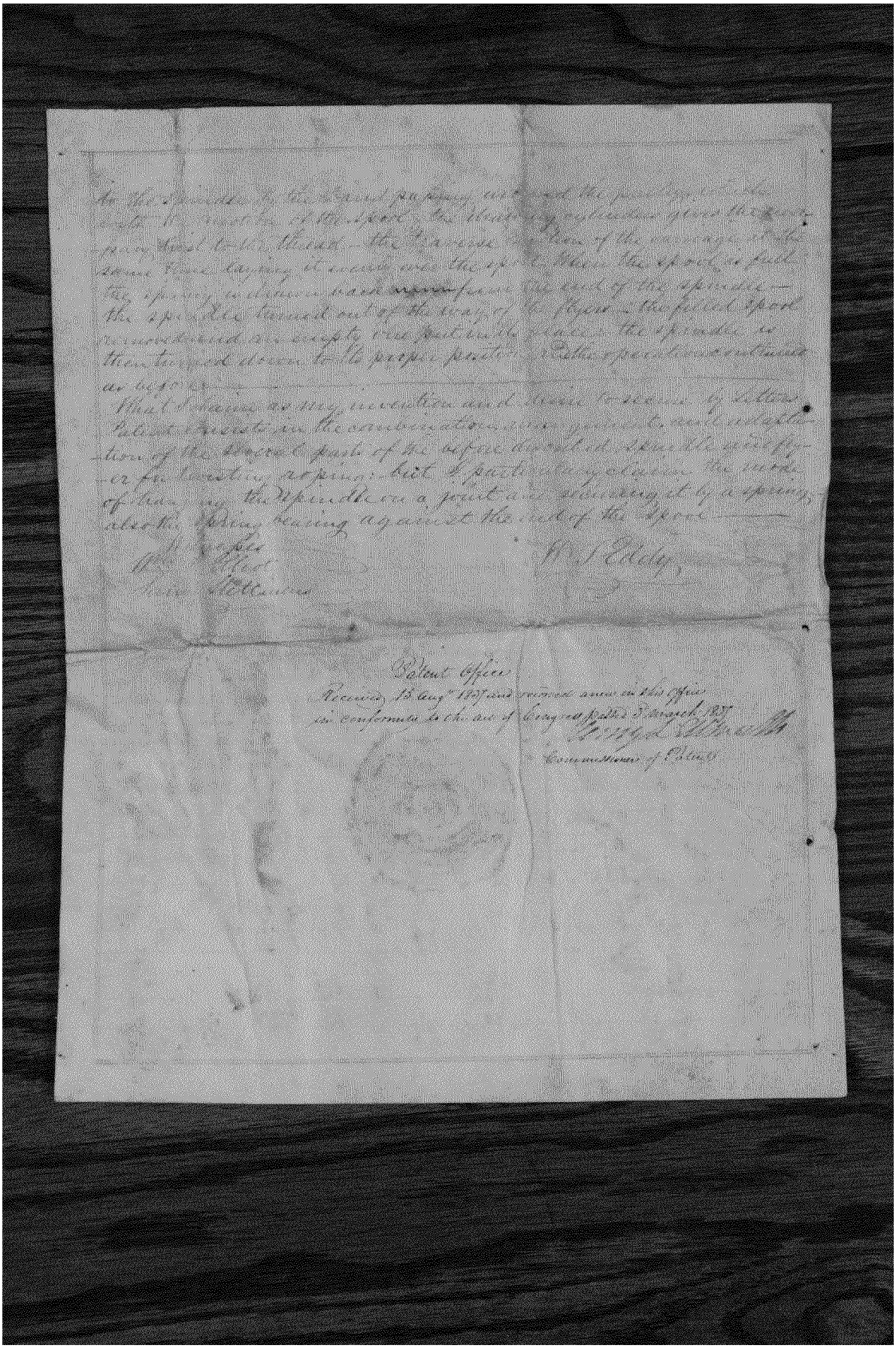
Patent Office
Received Feb.ry 10th and recorded same in this office in conformity to the act of Congress passed 3 March 1837
Commissioner of Patents No Printed Specification Available
9372X
*W. T. Eddy.*
*Spindle and Flyer.*
*Patented Feb. 10, 1836*
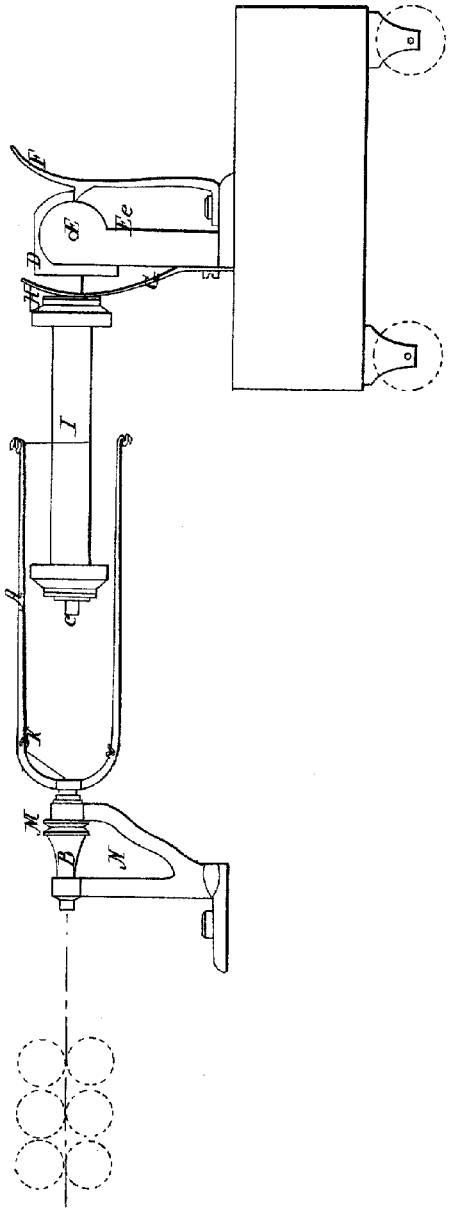
N. PETERS, PHOTO-LITHOGRAPHER, WASHINGTON, D. C.